United States Patent Office 3,287,363
Patented Nov. 22, 1966

3,287,363
1-(MONO AND BIS TERTIARY AMINO-4-HYDROXY-MONOCARBOCYCLIC ARYL)-1-(MONOCARBOCYCLIC ARYL)-2-(MONOCARBOCYCLIC ARYL)-ETHANES, ETHYLENES AND ETHANOLS
Frank P. Palopoli, Glenside, Pa., and Vernon J. Feil, Jamestown, N. Dak., assignors to Richardson-Merrell Inc., New York, N.Y., a corporation of Delaware
No Drawing. Filed Oct. 21, 1963, Ser. No. 317,795
21 Claims. (Cl. 260—246)

This invention relates to a novel class of Mannich derivatives of triphenylethanols, triphenylethylenes, and triphenylethanes. The compounds of the present invention are distinguished by their anti-inflammatory, pituitary gonadotrophin inhibiting and estrogenic activity. Some of the compounds possess various combinations of these properties.

The class of compounds contemplated by the present invention are Mannich derivatives corresponding to the formula:

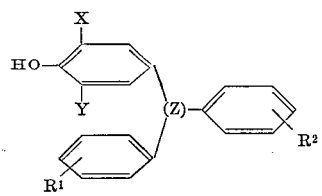

wherein Z is a polyvalent radical selected from ethanol

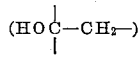

ethylene (>C=CH—) and ethane (>CH—CH$_2$—); X is a Mannich group of the formula

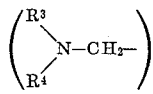

wherein $R^3$ and $R^4$ are lower aliphatic radicals containing between one and about five carbon atoms and $R^3$ and $R^4$ taken together form a heterocycle ring structure; Y is selected from hydrogen and X; and $R^1$ and $R^2$ are selected from hydrogen, lower alkyl, lower alkoxyl, halogen and trifluoromethyl.

The groups $R^3$ and $R^4$ include methyl, ethyl, propyl, isobutyl, and the like, and when $R^3$ and $R^4$ are taken together with the nitrogen to which they are attached they can form groups such as morpholino, piperidino, N-methylpiperazino, pyrrolidino, and the like.

$R^1$ and $R^2$ include groups such as methyl, ethyl, pentyl, methoxy, propoxy, isobutoxy, chlorine, bromine, fluorine, iodine, trifluoromethyl and the like.

The invention compounds also include the pharmaceutically acceptable acid addition salts such as those prepared from hydrochloric acid, hydrobromic acid, citric acid, succinic acid, maleic aid and the like.

The ethanol compounds can be prepared by reacting a substituted benzylmagnesium chloride or bromide with an appropriately substituted benzophenone:

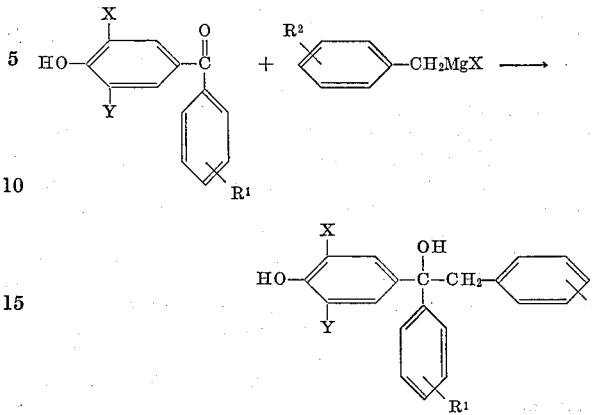

Another method of preparing the novel ethanol compounds is by the reaction of a suitably substituted phenolic triphenylethanol derivative with formaldehyde and the appropriate amine:

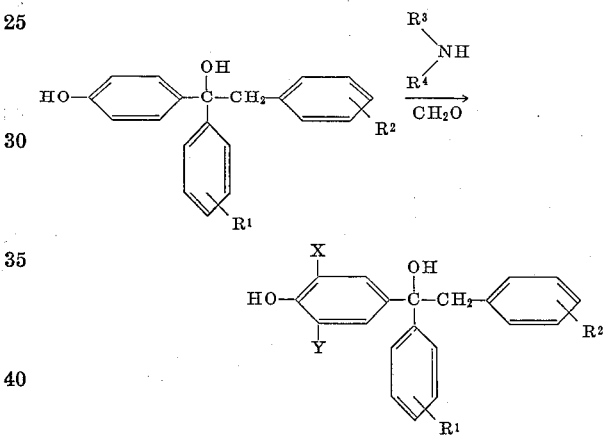

When equivalent amounts of the phenolic compound, amine and formaldehyde starting materials are employed, the product is a mono-Mannich derivative. When two or more equivalents of amine and two or more equivalents of formaldehyde are used per equivalent of phenolic compound, then the resulting product is a bis-Mannich derivative.

The reaction of a benzylmagnesium halide or of a substituted benzylmagnesium halide with the benzophenone ketones is conveniently conducted at room temperatures or slightly higher in an anhydrous ether solvent. However, these reactions are operative at temperatures down to −20° C. and lower, and at temperatures up to about 150° C. and higher. For reactions at the higher temperatures, higher boiling solvents such as tetrahydrofuran or di-n-butyl ether are employed. Another method useful for achieving higher reaction temperatures is by the preparation of Grignard reagent in the usual manner in diethyl ether and then replacing the ether with a hydrocarbon solvent, such as anhydrous benzene or toluene, for the subsequent reaction of the Grignard reagent with the ketones. The Grignard reactions can also be carried out in tertiary amine solvents, such as dimethylaniline and N-alkyl morpholines.

The Mannich reaction may also be accomplished by reacting the phenolic ketone with an anhydrous or aqueous solution of an appropriate amine and formaldehyde at room temperature or up to the reflux temperature of a solvent system such as methanol, ethanol, dioxane, and the like.

The ethanol compounds of the present invention can be recoved from the reaction medium by removing the volatile solvent medium by distillation and then crystallizing the phenolic Mannich derivative from a solvent such as diethyl ether, hexane or ethanol. The crude phenolic Mannich product may also be purified advantageously by conversion to the corresponding acetate ester. The acetate ester derivative of phenolic Mannich ketones may also be utilized for the preparation of the compounds of the present invention. When the acetate ester of the benzophenone derivative is utilized in the prepartion of these compounds, it is necessary to employ an extra equivalent of the Grignard reagent. This reaction results in an intermediate which is hydrolyzed to yield the phenolic derivative of the desired product.

The novel ethylene compounds of the present invention are readily prepared by dehydrating the ethanol derivatives of the present invention in the presence of acids such as hydrochloric acid, hydrobromic acid, phosphoric acid, paratoluenesulfonic acid, and the like. The ethylene compounds of the present invention correspond to the formula:

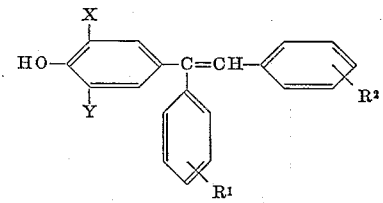

wherein X, Y, $R^1$ and $R^2$ are as defined above.

The ethane derivatives of the present invention can be prepared by hydrogenation of the above ethylene compounds. Hydrogenation can be accomplished by the use of hydrogen in the presence of an appropriate catalyst such as palladium-on-charcoal. The ethane compounds of the present invention correspond to the formula:

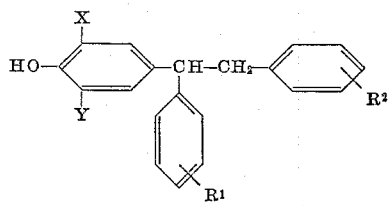

wherein X, Y, $R^1$ and $R^2$ are as defined above.

As estrogens, the present invention compounds are useful in the treatment of various gynecological disorders, e.g., irregular menstruation menopausal dysfunction, and similar conditions. The compounds are active both orally and parenterally and can be administered by either route.

As anti-inflammatory agents, the present compounds are useful in alleviating the symptoms of such collagen diseases as arthritis and rheumatism and in the topical treatment of inflammation. Some of the compounds possess a combination of anti-inflammatory and estrogenic activity and are especially useful for this reason.

As gonadotrophic inhibition agents, the compounds are useful for the treatment of fertility and sterility problems and can be administered orally or parenterally for this purpose.

The compounds can be used orally and parenterally in doses ranging from 1 milligram up to about 4 grams daily depending on the condition under treatment and the route of administration. For topical use the compounds can be incorporated into creams, ointments, or lotions in concentrations of up to 10 percent. In aerosol sprays, the concentration can be in the order of about 0.05 to 1 percent.

Compounds of the present invention will be further illustrated by reference to the following examples.

EXAMPLE 1

*1-(3-dimethylaminomethyl-4-hydroxyphenyl)-1-(p-tolyl)-2-phenylethanol*

A solution of 3-dimethylaminomethyl-4-hydroxy-4'-methylbenzophenone (8.1 grams, 0.03 mole) in 100 milliliters of dry benzene was added to an ether solution of benzylmagnesium chloride prepared from benzyl chloride (12.7 grams, 0.1 mole) and magnesium (2.7 grams, 0.11 g. atom). The reaction was refluxed for one hour and then poured into a cold solution of ammonium chloride. The organic layer was removed and dried over magnesium sulfate. The solvents were distilled off and the residue crystallized by triturating with ether. The solid obtained was recrystallized from ethanol to give 1-(3- dimethylaminomethyl - 4 - hydroxyphenyl)-1-(p-tolyl)-2-phenylethanol, M.P. 130–132° C.

The 3-dimethylaminomethyl-4-hydroxy-4'-methyl- benzophenone was prepared as follows:

Formalin, 16.2 grams of 37% (0.2 mole), was added to a solution of p-hydroxy-p'-methylbenzophenone (42.4 grams, 0.2 mole) in 150 milliliters of ethanol and 36 grams of 25% aqueous dimethylamine (0.2 mole). The precipitate that resulted was dissolved by gentle warming for 30 minutes. The reaction was then refluxed for 3 hours. The solvents were removed at reduced pressure and the resulting oil was triturated with ether to give 3-dimethylaminomethyl-4-hydroxy-4'-methylbenzophenone, M.P. 116–120° C.

EXAMPLE 2

*1-(3-morpholinomethyl-4-hydroxyphenyl)-1-phenyl-2-(p-chlorophenyl)ethanol*

3-morpholinomethyl - 4 - acetoxybenzophenone hydrochloride (11.2 grams, 0.03 mole) was neutralized with a dilute solution of sodium bicarbonate and the free amine extracted with benzene. After the benzene solution was dried over sodium sulfate, it was added to an ether solution of p-chlorobenzylmagnesium chloride, prepared from p-chlorobenzyl chloride (16.1 grams, 0.1 mole) and magnesium (3.0 grams, 0.12 g. atom). The reaction mixture was refluxed for 2 hours and then poured into a cold solution of ammonium chloride. The organic layer was removed and dried over magnesium sulfate. The solvents were removed to give an oil, which was chromatographed on activated alumina. Methylene chloride, ethyl acetate and methanol were used successively as eluents. Methanol eluted 1-(3-morpholino-methyl-4-hydroxyphenyl)-1-phenyl-2-(p-chlorophenyl)ethanol, melting at 145–148° C. after recrystallization from ether.

When dimethylamine was replaced with morpholine and p-hydroxy-p'-methylbenzophenone was replaced with p-hydroxybenzophenone in the Mannich reaction of Example 1, 3 - morpholinomethyl-4-hydroxybenzophenone was obtained as an oil. This oil, when dissolved in methylene chloride and refluxed with an excess of acetyl chloride, gave 3 - morpholinomethyl-4-acetoxybenzophenone hydrochloride, melting at 195–198° C. after recrystallization from dimethylformamide-ether.

EXAMPLE 3

*1-(3-dimethylaminomethyl-4-hydroxyphenyl)-1-(m-trifluoromethylphenyl)-2-(p-chlorophenyl)ethanol*

Reaction of 3 - dimethylaminomethyl-4-hydroxy-3'-trifluoromethylbenzophenone (2.6 grams, 0.008 mole) with an ether solution containing 0.03 mole of p-chlorobenzylmagnesium chloride, as in the procedure of Example 1, gave 1-(3-dimethylaminomethyl-4-hydroxyphenyl)-1-(m- trifluoromethylphenyl)-2-(p-chlorophenyl)ethanol as an oil, which was purified by chromatography.

When p-hydroxy-p'-methylbenzophenone was replaced with p-hydroxy-m-trifluoromethylbenzophenone in the Mannich reaction of Example 1, 3-dimethylaminomethyl-4-hydroxy-3'-trifluoromethylbenzophenone was obtained, M.P. 98–100° C., from ether.

EXAMPLE 4

*1-(3-morpholinomethyl-4-hydroxyphenyl)-1-phenyl-2-(p-methoxyphenyl)ethanol*

When p-chlorobenzylmagnesium chloride was replaced with p-methoxybenzylmagnesium chloride in the procedure of Example 2, 1-(3-morpholinomethyl-4-hydroxyphenyl)-1-phenyl-2 - (p-methoxyphenyl)ethanol was obtained, M.P. 148–151° C., from ethanol.

EXAMPLE 5

*1-(3-morpholinomethyl-4-hydroxyphenyl)-1-phenyl-2-(p-fluorophenyl)ethanol*

When p-chlorobenzylmagnesium chloride was replaced with p-fluorobenzylmagnesium chloride in the procedure of Example 2, 1-(3-morpholinomethyl-4-hydroxyphenyl)-1-phenyl-2-(p-fluorophenyl)ethanol was obtained, M.P. 152–155° C., from a mixture of acetonitrile and ether.

EXAMPLE 6

*1-(3-dimethylaminomethyl-4-hydroxyphenyl)-1,2-bis-(p-chlorophenyl)ethanol*

When 3-morpholinomethyl-4-acetoxybenzophenone was replaced with 3-dimethylaminomethyl-4-acetoxy-4'-chlorobenzophenone in the procedure of Example 2, 1-(3-dimethylaminomethyl-4-hydroxyphenyl)-1,2-bis(p - chlorophenyl)ethanol was obtained as an oil, which was purified by chromatography on alumina.

When p-hydroxy-p'-methylbenzophenone was replaced with p-hydroxy-p'-chlorobenzophenone in the procedure of Example 1, 3-dimethylaminomethyl-4-hydroxy-4'-chlorobenzophenone was obtained, M.P. 109–110° C., from ether. The phenol was refluxed with an excess of acetyl chloride to give 3 - dimethylaminomethyl-4-acetoxy-4'-chlorobenzophenone hydrochloride, M.P. 181–184° C., from methylene chloride-butanone.

EXAMPLE 7

*1-(3-dimethylaminomethyl-4-hydroxyphenyl)-1-phenyl-2-(p-chlorophenyl)ethanol*

When 3 - dimethylaminomethyl-4-hydroxy-4'-methylbenzophenone was replaced with 3-dimethylaminomethyl-4-hydroxybenzophenone in the procedure of Example 1, 1-(3 - dimethylaminomethyl-4-hydroxyphenyl)-1-phenyl-2-(p-chlorophenyl)ethanol was obtained as an oil.

When p-hydroxy-p'-methylbenzophenone was replaced with p-hydroxybenzophenone in the procedure of Example 1, 3 - dimethylaminomethyl-4-hydroxybenzophenone was obtained as an oil.

EXAMPLE 8

*1-[3,5-bis(dimethylaminomethyl)-4-hydroxyphenyl]-1-(p-tolyl)-2-phenylethanol*

An ether solution of benzylmagnesium chloride (0.15 mole) was added to a solution of 3,5-bis(dimethylaminomethyl)-4-hydroxy-4'-methylbenzophenone (16.3 grams, 0.05 mole) in 200 milliliters of dry tetrahydrofuran. The mixture was refluxed for 2 hours and poured into a cold solution of ammonium chloride. The organic layer was removed and dried over sodium sulfate. The solvents were removed by distillation and the residue was dissolved in ether. Concentration of the ether solution yielded a solid which was recrystallized from acetonitrile to give 1-[3,5 - bis(dimethylaminomethyl)-4-hydroxyphenyl]-1-(p-tolyl)-2-phenylethanol, M.P. 117–120° C.

To a solution of p-hydroxy-p'-methylbenzophenone (106 grams, 0.5 mole) in 300 milliliters of ethanol and 198 grams of 25% aqueous dimethylamine (1.1 mole) was added 89.2 grams of 37% formalin (1.1 mole). The solution was refluxed for 3 hours and some of the ethanol was removed at reduced pressure. The solution was cooled, the precipitated solid was removed by filtration, washed with cold ether and recrystallized from ethanol to yield 3,5-bis(dimethylaminomethyl)-4-hydroxy-4'-methylbenzophenone, M.P. 128–130° C.

EXAMPLE 9

*1-[3,5-bis(dimethylaminoethyl)-4-hydroxyphenyl]-1-phenyl-2-(p-chlorophenyl)ethanol*

When a benzene solution of 3,5-bis(dimethylaminomethyl)-4-hydroxybenzophenone, obtained by neutralizing 11.5 grams (0.03 mole) of the dihydrochloride with sodium carbonate, was reacted with p-chlorobenzylmagnesium chloride as in the procedure of Example 8, 1-[3,5 - bis(dimethylaminomethyl) - 4 - hydroxyphenyl]-1-(p-chlorophenyl)ethanol was obtained, M.P. 126–128° C.

When p-hydroxy-p'-methylbenzophenone was replaced with p-hydroxybenzophenone in the Mannich reaction of Example 8, 3,5-bis(dimethylaminoethyl)-4-hydroxybenzophenone was obtained as an oil. This oil was treated with an excess of alcoholic hydrogen chloride and crystallized from methanol to give 3,5-bis(dimethylaminomethyl)-4-hydroxybenzophenone dihydrochloride, M.P. 210–213° C. (the monohydrate melts at 230–233° C.)

EXAMPLE 10

*1-[3,5-bis(morpholinomethyl)-4-hydroxyphenyl]-1,2-diphenylethanol*

Reaction of 3,5 - bis(morpholinomethyl) - 4 - hydroxybenzophenone (15.9 grams, 0.04 mole) in 200 milliliters of tetrahydrofuran with an ether solution containing benzylmagnesium chloride (0.15 mole) as in the procedure of Example 8, gave 1-[3,5-bis(morpholinomethyl)-4-hydroxyphenyl]-1,2-diphenylethanol, melting at 154–156° C., after recrystallization from acetone-alcohol.

When dimethylamine was replaced with morpholine and p-hydroxy-p'-methylbenzophenone was replaced with p-hydroxybenzophenone in the Mannich reaction of Example 8, 3,5 - bis(morpholinomethyl) - 4 - hydroxybenzophenone was obtained, melting at 150–152° C., from ethanol.

EXAMPLE 11

*1-[3,5-bis(dimethylaminomethyl)-4-hydroxyphenyl]-1-phenyl-2-(p-methoxyphenyl)ethanol*

When p-chlorobenzylmagnesium chloride was replaced with p-methoxybenzylmagnesium chloride in the procedure of Example 9, 1-[3,5-bis(dimethylaminomethyl)-4-hydroxyphenyl] - 1 - phenyl-2-(p-methoxyphenyl)ethanol was obtained, M.P. 123–124° C., from ether.

EXAMPLE 12

*1-[3,5-bis(dimethylaminomethyl)-4-hydroxyphenyl]-1,2-diphenylethanol*

When p-chlorobenzylmagnesium chloride was replaced with benzylmagnesium chloride in the procedure of Example 9, 1-[3,5-bis(dimethylaminomethyl)-4-hydroxyphenyl]-1,2-diphenylethanol was obtained, M.P. 130–133° C., from ether.

EXAMPLE 13

*1-[3,5-bis(dimethylaminomethyl)-4-hydroxyphenyl]-1-phenyl-2-(p-fluorophenyl)ethanol*

When p-chlorobenzylmagnesium chloride was replaced with p-fluorobenzylmagnesium chloride in the procedure of Example 9, 1-[3,5-bis(dimethylaminomethyl)-4-hydroxyphenyl]-1-phenyl-2-(p-fluorophenyl)ethanol was obtained, M.P. 135–138° C., from ether.

EXAMPLE 14

*1-[3,5-bis(dimethylaminomethyl)-4-hydroxyphenyl]-1-phenyl-2-(p-tolyl)ethanol*

When p-chlorobenzylmagnesium chloride was replaced with p-methylbenzylmagnesium bromide in the procedure of Example 9, 1-[3,5-bis(dimethylaminomethyl)-4-hydroxyphenyl]-1-phenyl-2-(p-tolyl)ethanol was obtained, M.P. 105–107° C., from ether-hexane.

EXAMPLE 15

*1-[3,5-bis(piperidinomethyl)-4-hydroxyphenyl]- 1,2-diphenylethanol*

When 3,5 - bis(dimethylaminomethyl) - 4 - hydroxy-4'-methylbenzophenone was replaced with 3,5-bis(piperidylmethyl)-4-hydroxybenzophenone in the procedure of Example 8, 1-[3,5-bis(piperidinomethyl)-4-hydroxyphenyl]-1,2-diphenylethanol was obtained, M.P. 117–119° C., from ether-petroleum ether.

When p-hydroxy-p'-methylbenzophenone was replaced with p-hydroxybenzophenone and dimethylamine was replaced with piperidine in the Mannich reaction of Example 8, 3,5-bis(piperidinomethyl)-4-hydroxybenzophenone was obtained, M.P. 86–90° C., from ethanol.

EXAMPLE 16

*1-(3-Pyrrolidinomethyl-4-hydroxyphenyl)-1-(p-tolyl)-2- (m-trifluoromethylphenyl)ethanol*

When 3-morpholinomethyl-4-acetoxybenzophenone hydrochloride was replaced with 3-pyrrolidinomethyl-4-acetoxy-4'-methylbenzophenone hydrochloride in the procedure of Example 2, 1-(3-pyrrolidinomethyl-4-hydroxyphenyl) - 1-(p-tolyl)-2-(m-trifluoromethylphenyl)ethanol was obtained, M.P. 144–147° C., from ether.

When dimethylamine was replaced with pyrrolidine in the Mannich reaction of Example 1, 3-pyrrolidinomethyl-4-hydroxy-4'-methylbenzophenone was obtained as an oil. The oil was refluxed with an excess of acetyl chloride in methylene chloride to yield 3-pyrrolidinomethyl-4-acetoxy-4'-methylbenzophenone hydrochloride, M.P. 190–193° C., from dimethylformamide-ether.

EXAMPLE 17

*1-[3,5-bis(dimethylaminomethyl)-4-hydroxyphenyl]-1-(p-tolyl)-2-(p-chlorophenyl)ethanol*

To a solution of 1-(p-hydroxyphenyl)-1-(p-tolyl)-2-(p-chlorophenyl)ethanol (10 grams, 0.03 mole) in 50 milliliters of ethanol and 16.2 grams of 25% aqueous dimethylamine (0.09 mole) was added 11 milliliters of 37% formalin (0.13 mole). The solution was refluxed on the steam bath for 12 hours and the solvent was removed at reduced pressure. The residue was dissolved in benzene and dried azeotropically. The solvent was removed and the residue crystallized from ether to give the desired product, 1 - [3,5 - bis(dimethylaminomethyl)-4-hydroxyphenyl]-1-(p-tolyl)-2-(p-chlorophenyl)-ethanol as a white crystalline solid, M.P. 114–115.5° C.

The 1 - (p - hydroxyphenyl) - 1-(p-tolyl)-2-(p-chlorophenyl) ethanol was prepared by adding a solution of 4-hydroxy-4'-methylbenzophenone (21.2 grams, 0.1 mole) in 100 milliliters of tetrahydrofuran and 150 milliliters of ether to an ether solution of p-chlorobenzylmagnesium chloride, prepared from p-chlorobenzylchloride (48 grams, 0.3 mole) and magnesium (12 grams, 0.5 g. atom). After addition was complete, dry benzene was added and the ether was removed by distillation. The reaction mixture was refluxed for 4 hours, cooled, and an excess of aqueous ammonium chloride was added. The organic layer was removed and the aqueous layer extracted with ether. The combined extracts were dried over magnesium sulfate and the solvents were removed by distillation. The residue was dissolved in ether and precipitated with petroleum ether. Recrystallization of the resulting solid from ether gave the desired 1-(p-hydroxyphenyl) - 1 - (p - tolyl)-2-(p-chlorophenyl)-ethanol, M.P. 147–150° C.

EXAMPLE 18

*1-(3-dimethylaminomethyl-4-hydroxyphenyl)-1-(p-tolyl)-2-phenylethylene*

An ethanol solution containing 1-(3-dimethylaminomethyl - 4 - hydroxyphenyl) - 1 - (p-tolyl) - 2 - phenylethanol (1.1 grams, 0.003 mole) and an excess of hydrogen chloride was refluxed for 2 hours. Most of the ethanol was removed at reduced pressure and ether was added to yield 1-(3-dimethylaminomethyl-4-hydroxyphenyl)-1-(p-tolyl)-2-phenylethylene hydrochloride, M.P. 203-222° C.

EXAMPLE 19

*1-(3-dimethylaminomethyl-4-hydroxyphenyl)- 1,2-bis(p-chlorophenyl)ethylene*

When 1-(3-dimethylaminomethyl-4-hydroxyphenyl)-1-(p-tolyl)-2-phenylethanol was replaced with 1-(3-dimethylaminomethyl - 4 - hydroxyphenyl) - 1,2 - bis(p-chlorophenyl)-ethanol in the procedure of Example 18, 1-(3-dimethylaminomethyl - 4 - hydroxyphenyl) - 1,2 - bis(p-chlorophenyl)ethylene hydrochloride was obtained, M.P. 264-272° C., from methanolbutanone.

EXAMPLE 20

*1-(3-dimethylaminomethyl-4-hydroxyphenyl)-1-phenyl-2-(p-chlorophenyl)ethylene*

When 1-(3-dimethylaminomethyl-4-hydroxyphenyl)-1-(p-tolyl)-2-phenylethanol was replaced with 1-(3-dimethylaminomethyl - 4 - hydroxyphenyl) - 1 - phenyl - 2-(p-chlorophenyl)ethanol in the procedure of Example 18, 1 - ( 3- dimethylaminomethyl - 4 - hydroxyphenyl) - 1-phenyl-2-(p-chlorophenyl)ethylene hydrochloride was obtained, M.P. 157-208° C., from methanolbutanone.

EXAMPLE 21

*1-(3-morpholinomethyl-4-hydroxyphenyl)-1-phenyl-2-(p-chlorophenyl)ethylene*

When 1-(3-dimethylaminomethyl-4-hydroxyphenyl)-1-(p-tolyl)-2-phenylethanol was replaced with 1-(3-morpholinomethyl - 4 - hydroxyphenyl) - 1 - phenyl - 2 - (p-chlorophenyl)ethanol in the procedure of Example 18, 1-(3 - morpholinomethyl - 4 - hydroxyphenyl) - 1 - phenyl-2-(p-chlorophenyl)ethylene hydrochloride was obtained, M.P. 231-233° C., from methanolbutanone.

EXAMPLE 22

*1-(3-morpholinomethyl-4-hydroxyphenyl)-1-phenyl-2-(p-methoxyphenyl)ethylene*

When 1-(3-dimethylaminomethyl-4-hydroxyphenyl)-1-(p-tolyl)-2-phenylethanol was replaced with 1-(3-morpholinomethyl - 4 - hydroxyphenyl) - 1 - phenyl - 2 - (p-methoxyphenyl)ethanol in the procedure of Example 18, 1 - (3 - morpholinomethyl - 4 - hydroxyphenyl) - 1-phenyl-2-(p-methoxyphenyl)ethylene hydrochloride was obtained, M.P. 214–222° C., from ethanol.

EXAMPLE 23

*1-(3-morpholinomethyl-4-hydroxyphenyl)-1-phenyl-2-(p-fluorophenyl)ethylene*

When 1-(3-dimethylaminomethyl-4-hydroxyphenyl)-1-(p-tolyl)-2-phenylethanol was replaced with 1-(3-morpholinomethyl - 4 - hydroxyphenyl) - 1 -phenyl - 2 - (p-fluorophenyl)ethanol in the procedure of Example 18, 1-(3 - morpholinomethyl - 4 - hydroxyphenyl - 1 - phenyl-2-(p-fluorophenyl)ethylene hydrochloride was obtained, M.P. 153–200°C., from butanone.

EXAMPLE 24

*1-(3-dimethylaminomethyl-4-hydroxyphenyl)-1-(p-tolyl)-2-(p-chlorophenyl)ethylene*

When 1-(3-dimethylaminomethyl-4-hydroxyphenyl)-1-(p-tolyl)-2-phenylethanol was replaced with 1-(3-dimethylaminomethyl - 4 - hydroxyphenyl) - 1 - (p - tolyl)-2-(p-chlorophenyl)ethanol in the procedure of Example 18, the desired 1-(3-dimethylaminomethyl-4-hydroxyphenyl) - 1 - (p - tolyl) - 2 - (p - chlorophenyl)ethylene hydrochloride was obtained as a white crystalline solid, M.P. 255–257° C.

EXAMPLE 25

*1-[3,5-bis(dimethylaminomethyl)-4-hydroxyphenyl]-1-phenyl-2-(p-tolyl)ethylene*

When 1-(3-dimethylaminomethyl-4-hydroxyphenyl)-1-(p-tolyl)-2-phenylethanol was replaced with 1-[3,5-bis(dimethylaminomethyl) - 4 - hydroxyphenyl] - 1 - phenyl-2-(p-tolyl)ethanol in the procedure of Example 18, 1-[3,5-bis(dimethylaminomethyl) - 4 - hydroxyphenyl] - 1-phenyl-2-(p-tolyl)ethylene dihydrochloride was obtained, M.P. 237–239° C., from ethanol-ether.

EXAMPLE 26

*1-[3,5-bis(dimethylaminomethyl)-4-hydroxyphenyl]-1-phenyl-2-(p-chlorophenyl)ethylene*

When 1-(3-dimethylaminomethyl-4-hydroxyphenyl)-1-(p-tolyl)-2-phenylethanol was replaced with 1-[3,5-bis-(dimethylaminomethyl) - 4 - hydroxyphenyl] - 1 - phenyl-2-(p-chlorophenyl)ethanol in the procedure of Example 18, 1 - [3,5 - bis(dimethylaminomethyl) - 4 - hydroxyphenyl] - 1 - phenyl - 2 - (p - chlorophenyl - ethylene dihydrochloride was obtained, M.P. 231–233° C., from ethanol-ether.

EXAMPLE 27

*1-[3,5-bis(dimethylaminomethyl)-4-hydroxyphenyl]-1-phenyl-2-(p-methoxyphenyl)ethylene*

When 1-(3-dimethylaminomethyl-4-hydroxyphenyl)-1-(p-tolyl)-2-phenylethanol was replaced with 1-[3,5-bis-(dimethylaminomethyl) - 4 - hydroxyphenyl] - 1 - phenyl-2-(p-methoxyphenyl)ethanol in the procedure of Example 18, 1 - [3,5 - bis(dimethylaminomethyl) - 4 - hydroxyphenyl] - 1 - phenyl - 2 - (p - methoxyphenyl)ethylene dihydrochloride was obtained, M.P. 215–218° C., from ethanol-ether.

EXAMPLE 28

*1-[3,5-bis(dimethylaminomethyl)-4-hydroxyphenyl]-1-(p-tolyl)-2-phenylethylene*

When 1-(3-dimethylaminomethyl-4-hydroxyphenyl)-1-(p-tolyl)-2-phenylethanol was replaced with 1-[3,5-bis-(dimethylaminomethyl) - 4 - hydroxyphenyl] - 1 - (p-tolyl)-2-phenylethanol in the procedure of Example 18, 1 - [3,5 - bis(dimethylaminomethyl) - 4 - hydroxyphenyl]-1-(p-tolyl)-2-phenylethylene dihydrochloride was obtained, M.P. 212–223° C., from methanolbutanone.

EXAMPLE 29

*1-[3,5-bis(dimethylaminomethyl)-4-hydroxyphenyl]-1,2-diphenylethylene*

When 1-3(-dimethylaminomethyl-4-hydroxyphenyl)-1-(p-tolyl)-2-phenylethanol was replaced with 1-[3,5-bis-(dimethylaminomethyl) - 4 hydroxyphenyl] - 1,2 , diphenylethanol in the procedure of Example 18, 1-[3,5-bis(dimethylaminomethyl) - 4 - hydroxyphenyl] - 1,2-diphenylethylene dihydrochloride was obtained, M. P. 218–232° C., from methanol-butanone-ether.

EXAMPLE 30

*1[3,5-bis(morpholinomethyl)-4-hydroxyphenyl]-1,2-diphenylethylene*

When 1-(3-dimethylaminomethyl-4-hydroxyphenyl)-1-(p-tolyl)-2-phenylethanol was replaced with 1-[3,5-bis-(morpholinomethyl) - 4 - hydroxyphenyl] - 1,2 - diphenylethanol in the procedure of Example 18, 1-[3,5-bis-(morpholinomethyl) - 4 - hydroxyphenyl] - 1,2 - diphenylethylene dihydrochloride was obtained, M.P. 213–225° C., from methanol-butanone.

EXAMPLE 31

*1[3,5-bis(piperidinomethyl)-4-hydroxyphenyl]1,2-diphenylethylene*

When 1-(3-dimethylaminomethyl - 4 - hydroxyphenyl)-1-(p-tolyl)-2-phenylethanol was replaced with 1-[3,5-bis-(piperidinomethyl) - 4 - hydroxyphenyl] - 1,2 - diphenylethanol in the procedure of Example 18, 1-[3,5-bis(piperidinomethyl) - 4 - hydroxyphenyl] - 1,2 - diphenylethylene dihydrochloride was obtained, M.P. 236–242° C., from ethanol-ether.

EXAMPLE 32

*1-[3,5-bis(dimethylaminomethyl)-4-hydroxyphenyl]-1-phenyl-2-(p-fluorophenyl)ethylene*

When 1-(3-dimethylaminomethyl-4-hydroxyphenyl)-1-(p-tolyl)-2-phenylethanol was replaced with 1-[3,5-bis-(dimethylaminomethyl) - 4 - hydroxyphenyl] - 1 - phenyl-2-(p-fluorophenyl)ethanol in the procedure of Example 18, 1-[3,5-bis-(dimethylaminomethyl)-4-hydroxyphenyl]-1-phenyl-2-(p-fluorophenyl)ethylene dihydrochloride was obtained, M.P. 237–240° C., from ethanol-ether.

EXAMPLE 33

*1-[3,5bis(dimethylaminomethyl)-4-hydroxyphenyl]-1-(p-tolyl)-2-(p-chlorophenyl)ethylene*

When 1 - [3,5 - bis(dimethylaminomethyl)-4-hydroxyphenyl]-1-(p-tolyl)-2-(p-chlorophenyl)ethanol replaced 1-(3 - dimethylaminomethyl-4-hydroxyphenyl)-1-(p-tolyl)-2-phenyl ethanol in the procedure of Example 18, 1-[3,5-bis(dimethylaminomethyl) - 4 - hydroxyphenyl] - 1 - (p-tolyl)-2-(p-chlorophenyl)-ethylene dihydrochloride was obtained as a white solid, M.P. 240–242° C.

EXAMPLE 34

*1-(3-pyrrolidinomethyl-4-hydroxyphenyl)-1-(p-tolyl)-2-(m-trifluoromethylphenyl)ethylene*

When 1-(3-dimethylaminomethyl-4-hydroxyphenyl)-1-(p-tolyl)-2-phenylethanol was replaced with 1-(3-pyrrolidonomethyl-4-hydroxyphenyl)-1-(p-tolyl - 2 - (m-trifluoromethylphenyl)ethanol in the procedure of Example 18, 1-(3-pyrrolidinomethyl-4-hydroxyphenyl)-1-(p-tolyl)-2-(m-trifluoromethylphenyl)ethylene hydrochloride was obtained, M.P. 181–225° C., from butanone-ether.

EXAMPLE 35

*1-[3,5-bis(morpholinomethyl)-4-hydroxyphenyl]-1,2-diphenylethane*

A solution of 1-[3,5-bis(morpholinomethyl)-4-hydroxyphenyl]-1,2-diphenylethylene dihydrochloride (5.3 grams, 0.01 mole) in 250 milliliters of ethanol was hydrogenated, using 1 gram of 10 percent palladium on charcoal catalyst, at room temperature and 3 atmospheres pressure until the uptake of hydrogen ceased. The catalyst was filtered off and the solvent was removed by distillation. The residue that remained was recrystallized from methanol-butanone to yield 1-[3,5-bis(morpholinomethyl)-4-hydroxyphenyl]-1,2 - diphenylethane dihydrochloride, M.P. 210–213° C.

EXAMPLE 36

*1-[3,5-bis(dimethylaminomethyl)-4-hydroxyphenyl]-1-phenyl-2-(p-methoxyphenyl)ethane*

When 1 - [3,5-bis(morpholinomethyl) - 4 - hydroxyphenyl]-1,2-diphenylethylene dihydrochloride was replaced with 1-[3,5-bis(dimethylaminomethyl)-4-hydroxyphenyl]-1-phenyl-2-(p-methoxyphenyl)ethylene in the procedure of Example 35, 1-[3,5-bis(dimethylaminomethyl)-4-hydroxyphenyl]-1-phenyl-2-(p - methoxyphenyl)ethane dihydrochloride was obtained, M.P. 233–236° C., from ethanol.

EXAMPLE 37

*1-[3,5-bis(dimethylaminomethyl)-4-hydroxyphenyl]-1-(p-tolyl)-2-phenylethane*

When 1 - [3,5 - bis(morpholinomethyl) - 4 - hydroxyphenyl]-1,2-diphenylethylene dihydrochloride was replaced with 1-[3,5-bis(dimethylaminomethyl)-4-hydroxyphenyl]-1-(p-tolyl)-2-phenylethylene in the procedure of Example 35, 1 - [3,5 - bis(dimethylaminomethyl)-4-hydroxyphenyl]-1-(p-tolyl)-2-phenylethane dihydrochloride was obtained, M.P. 197–199° C., from butanone.

EXAMPLE 38

*1-[3,5-bis(dimethylaminomethyl)-4-hydroxyphenyl]-1-phenyl-2-(p-tolyl)ethane*

When 1 - [3,5 - bis(morpholinomethyl) - 4 - hydroxyphenyl]-1,2-diphenylethylene dihydrochloride was replaced with 1-[3,5-bis(dimethylaminomethyl)-4-hydroxyphenyl]-1-phenyl-2-(p-tolyl)ethylene in the procedure of Example 35, 1 - [3,5 - bis(dimethylaminomethyl) - 4 - hydroxyphenyl]-1-phenyl-2-(p-tolyl)ethane dihydrochloride was obtained, M.P. 218–219° C., from ethanol-ether.

EXAMPLE 39

*1-(3-pyrrolidinomethyl-4-hydroxyphenyl)-1-(p-tolyl)-2-(m-trifluoromethylphenyl)ethane*

When 1 - [3,5 - bis(morpholinomethyl) - 4 - hydroxyphenyl]-1,2-diphenylethylene dihydrochloride was replaced with 1-(3-pyrrolidinomethyl-4-hydroxyphenyl)-1-(p-tolyl)-(m-trifluoromethylphenyl)ethylene in the procedure of Example 35, 1-(3-pyrrolidinomethyl-4-hydroxyphenyl)-1-(p-tolyl) - 2 - (m-trifluoromethylphenyl)ethane hydrochloride was obtained M.P. 193–196° C., from ethyl acetate.

EXAMPLE 40

*1[3,5-bis(piperidinomethyl)-4-hydroxyphenyl]-1,2-diphenylethane*

When 1-[3,5-bis(morpholinomethyl-4-hydroxyphenyl]-1,2-diphenylethylene dihydrochloride was replaced with 1-[3,5-bis(piperidinomethyl)-4-hydroxyphenyl] - 1,2 - diphenylethylene in the procedure of Example 35, 1-[3,5-bis(piperidinomethyl) - 4 - hydroxyphenyl]-1,2-diphenylethane dihydrochloride was obtained, M.P. 229–232° C., from ethanol-ether.

Example 41

*1-[3,5-bis(dimethylaminomethyl)-4-hydroxyphenyl]-1-phenyl-2-(p-fluorophenyl)ethane*

When 1-[3,5-bis(morpholinomethyl) - 4 - hydroxyphenyl]-1,2-diphenylethylene dihydrochloride was replaced with 1-(3-dimethylaminomethyl-4-hydroxyphenyl)-1-phenyl-2-(p-fluorophenyl)ethylene in the procedure of Example 35, 1-(3-dimethylaminomethyl - 4 - hydroxyphenyl)-1-phenyl-2-(p-fluorophenyl)ethane was obtained.

EXAMPLE 42

*1-[3,5-bis(dimethylaminomethyl)-4-hydroxyphenyl]-1-(p-tolyl)-2-phenylethane*

When 1 - [3,5-bis(morpholinomethyl) - 4 - hydroxyphenyl]-1,2-diphenylethylene dihydrochloride was replaced with 1-(3-dimethylaminomethyl-4-hydroxyphenyl)-1-(p-tolyl)-2-phenylethylene in the procedure of Example 35, 1 - (3-dimethylaminomethyl-4-hydroxyphenyl)-1-(p-tolyl)-2-phenylethane was obtained.

What is claimed is:

1. Compounds of the formula

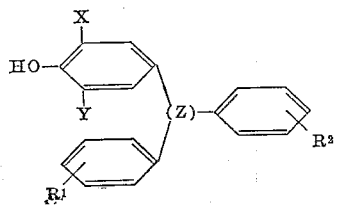

wherein Z is a polyvalent radical selected from

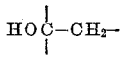

$>C=CH-$, and $>CH-CH_2-$; X is

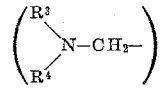

wherein $R^3$ and $R^4$ are lower alkyl having from one to five carbon atoms and $R^3$ and $R^4$ taken together form a heterocyclic ring selected from the group consisting of morpholino, piperidino, N-methylpiperazino, and pyrrolidino; Y is selected from hydrogen and X; and $R^1$ and $R^2$ are selected from hydrogen, lower alkyl, lower alkoxyl, halogen and trifluoromethyl.

2. 1 - (3-dimethylaminomethyl - 4 - hydroxyphenyl)-1-(p-tolyl)-2-phenylethanol.

3. 1 - (3 - morpholinomethyl - 4 - hydroxyphenyl) 1 - phenyl-2-(p-chlorophenyl)ethanol.

4. 1 - (3-dimethylaminomethyl - 4 - hydroxyphenyl)-1-(m-trifluoromethylphenyl)-2-(p-chlorophenyl)ethanol.

5. 1 - (3 - morpholinomethyl - 4 - hydroxyphenyl) - 1 - phenyl-2-(p-methoxyphenyl)ethanol.

6. 1 - (3 - morpholinomethyl - 4 - hydroxyphenyl) - 1 - phenyl-2-(p-fluorophenyl)ethanol.

7. 1 - (3-dimethylaminomethyl-4-hydroxyphenyl)-1,2-bis(p-chlorophenyl)ethanol.

8. 1 - (3-dimethylaminomethyl - 4 - hydroxyphenyl)-1-phenyl-2-(p-chlorophenyl)ethanol.

9. 1 - [3,5 - bis(dimethylaminomethyl) - 4 - hydroxy - phenyl]-1-(p-tolyl)-2-phenylethanol.

10. 1 - [3,5 - bis(dimethylaminomethyl) - 4 - hydroxyphenyl]-1-phenyl-2-(p-chlorophenyl)ethanol.

11. 1 - [3,5-bis(morpholinomethyl)-4-hydroxyphenyl]-1-2-diphenylethanol.

12. 1 - [3,5 - bis(dimethylaminomethyl - 4 - hydroxy - phenyl]-1-phenyl-2-(p-methoxyphenyl)ethanol.

13. 1 - [3,5 - bis(dimethylaminomethyl) - 4 - hydroxy - phenyl]-1,2-diphenylethanol.

14. 1 - [3,5 - bis(dimethylaminomethyl) - 4 - hydroxy - phenyl]-1-phenyl-2-(p-fluorophenyl)ethanol.

15. 1 - [3,5 - bis(dimethylaminomethyl) - 4 - hydroxy - phenyl]-1-phenyl-2-(p-tolyl)ethanol.

16. 1 - [3,5 - bis(piperidinomethyl)-4-hydroxyphenyl]-1,2-diphenylethanol.

17. 1 - (3 - pyrrolidinomethyl - 4 - hydroxyphenyl) - 1 - (p-tolyl)-2-(m-trifluoromethylphenyl)ethanol.

18. 1 - [3,5 - bis(dimethylaminomethyl) - 4 - hydroxy - phenyl]-1-(p-tolyl)-2-(p-chlorophenyl)ethanol.

19. 1 - [3,5 - bis(dimethylaminomethyl) - 4 - hydroxy - phenyl]-1-phenyl-2-(p-chlorophenyl)ethylene.

20. 1 - [3,5 - bis(dimethylaminomethyl) - 4 - hydroxy - phenyl]-1,2-diphenylethylene.

21. 1 - [3,5-bis(dimethylaminomethyl) - 4 - hydroxy - phenyl]-1-phenyl-2-(p-tolyl)ethane.

References Cited by the Examiner

UNITED STATES PATENTS 3,123,643   3/1964   Palopoli et al. _____ 269—570

ALEX MAZEL, *Primary Examiner.*

HENRY R. JILES, *Examiner.*

J. TOVAR, *Assistant Examiner.*

UNITED STATES PATENT OFFICE
CERTIFICATE OF CORRECTION

Patent No. 3,287,363                          November 22, 1966

Frank P. Palopoli et al.

It is hereby certified that error appears in the above numbered patent requiring correction and that the said Letters Patent should read as corrected below.

Column 1, line 63, for "aid" read -- acid --; column 3, line 10, for "recoved" read -- recovered --; line 20, for "prepartion" read -- preparation --; column 6, line 10, for "1-[3,5-bis(dimethylaminoethyl)" read -- 1-[3,5-bis(dimethylaminomethyl) --; column 6, lines 17 and 18, for "4-hydroxyphenyl]-1-(p-chlorophenyl)" read -- 4-hydroxyphenyl]-1-phenyl-2-(p-chlorophenyl) --; line 21, for "3,5-bis(dimethylaminoethyl)" read -- 3,5-bis(dimethylaminomethyl) --; column 7, line 57, for "grame" read -- grams --; column 9, line 51, for "3(" read -- (3 --; column 10, line 19, for "5" read -- 5- --; column 11, line 22, for "(p-tolyl)-" read -- (p-tolyl)-2- --; column 11, line 41, for "1-[3,5-bis(dimethylaminomethyl)-4-hydroxyphenyl]" read -- 1-(3-dimethylaminomethyl-4-hydroxyphenyl) --; line 53, for "1-[3,5-bis(dimethylaminomethyl)-4-hydroxyphenyl]" read -- 1-(3-dimethylaminomethyl-4-hydroxyphenyl) --.

Signed and sealed this 12th day of September 1967.

(SEAL)
Attest:

ERNEST W. SWIDER                          EDWARD J. BRENNER
Attesting Officer                       Commissioner of Patents